(12) United States Patent
Vadwa

(10) Patent No.: US 12,505,747 B2
(45) Date of Patent: Dec. 23, 2025

(54) INCIDENT DATA DETERMINATION BASED ON SENSOR DATA

(71) Applicant: Itron, Inc., Liberty Lake, WA (US)

(72) Inventor: Sahana Vadwa, Bangalore (IN)

(73) Assignee: Itron, Inc., Liberty Lake, WA (US)

( * ) Notice: Subject to any disclaimer, the term of this patent is extended or adjusted under 35 U.S.C. 154(b) by 165 days.

(21) Appl. No.: 18/238,399

(22) Filed: Aug. 25, 2023

(65) Prior Publication Data
US 2025/0069508 A1 Feb. 27, 2025

(51) Int. Cl.
G08G 1/16 (2006.01)
F21S 8/08 (2006.01)

(52) U.S. Cl.
CPC .............. *G08G 1/164* (2013.01); *F21S 8/085* (2013.01); *G08G 1/166* (2013.01)

(58) Field of Classification Search
CPC ......... G08G 1/164; G08G 1/166; F21S 8/085; G08B 29/186; G08B 29/188
See application file for complete search history.

(56) References Cited

U.S. PATENT DOCUMENTS

| 9,246,898 | B2 | 1/2016 | McKeeman et al. |
| 9,392,674 | B2 | 7/2016 | Lin et al. |
| 10,529,221 | B2 | 1/2020 | Jarrell et al. |
| 10,546,494 | B2 | 1/2020 | Cho et al. |
| 10,667,373 | B2 | 5/2020 | Cartmill et al. |
| 11,233,665 | B2 | 1/2022 | Longardner et al. |
| 2012/0062123 | A1 | 3/2012 | Jarrell et al. |
| 2014/0253733 | A1 | 9/2014 | Norem et al. |
| 2018/0180234 | A1 | 6/2018 | Spiro |
| 2019/0043351 | A1 | 2/2019 | Yang et al. |
| 2020/0370741 | A1 | 11/2020 | Hutson et al. |
| 2020/0375016 | A1 | 11/2020 | Hutson et al. |
| 2021/0302621 | A1 | 9/2021 | Brown |
| 2021/0327255 | A1 | 10/2021 | Brown et al. |
| 2023/0110269 | A1 | 4/2023 | Chien et al. |

(Continued)

FOREIGN PATENT DOCUMENTS

| JP | H11283760 A | 10/1999 |
| KR | 20180008361 A | 1/2018 |

OTHER PUBLICATIONS

Search Report and Written Opinion for International Application No. PCT/US2024/031482, Dated Dec. 23, 2024, 45 pages.

(Continued)

*Primary Examiner* — Rodney A Butler
(74) *Attorney, Agent, or Firm* — Lee & Hayes, P.C.

(57) ABSTRACT

Techniques for determining information about an incident by one or more sensors in a streetlight, utility meter, and/or other device are described herein. A device proximate a sensor(s) can process sensor data to determine an incident type and/or an incident location in an environment. For example, the device can detect presence of a weather event, an accident, a crime, a crowd control event, a fire, a flood, and so on. In some examples, the device can identify other sensors in a vicinity of the incident (e.g., attached to other streetlights, utility meters, transformers, etc.), and select sensors for gathering additional information about the incident based on the incident type and/or the incident location.

20 Claims, 4 Drawing Sheets

(56) References Cited

U.S. PATENT DOCUMENTS

2023/0284022 A1* 9/2023 Tang ................... H04W 12/08
726/12

OTHER PUBLICATIONS

Invitation to Pay Additional Fees for International Application No. PCT/US2024/031482, Dated Sep. 26, 2024, 18 pages.
Kuo, et al. "Design and Implementation of a Wide Area, Large-Scale Camera Network" Conference: Computer Vision and Pattern Recognition Workshops (CVPRW), 2010 IEEE Computer Society Conference; Jul. 2010; 8 pages.

* cited by examiner

INCIDENT DATA DETERMINATION BASED ON SENSOR DATA

BACKGROUND

Sensors can be used to capture audio or image information about an environment. For example, a sensor can be used to capture sound waves or an image representing activity in the environment. A computing device can determine whether the activity captured by the sensor is illegal activity affecting safety in the environment. However, using a sensor to determine presence of illegal activity can be difficult for a variety of reasons causing some illegal activity to not be detected or other activity to be falsely determined as illegal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. Moreover, the figures are intended to illustrate general concepts, and not to indicate required and/or necessary elements.

DETAILED DESCRIPTION

Overview

Figure 1:
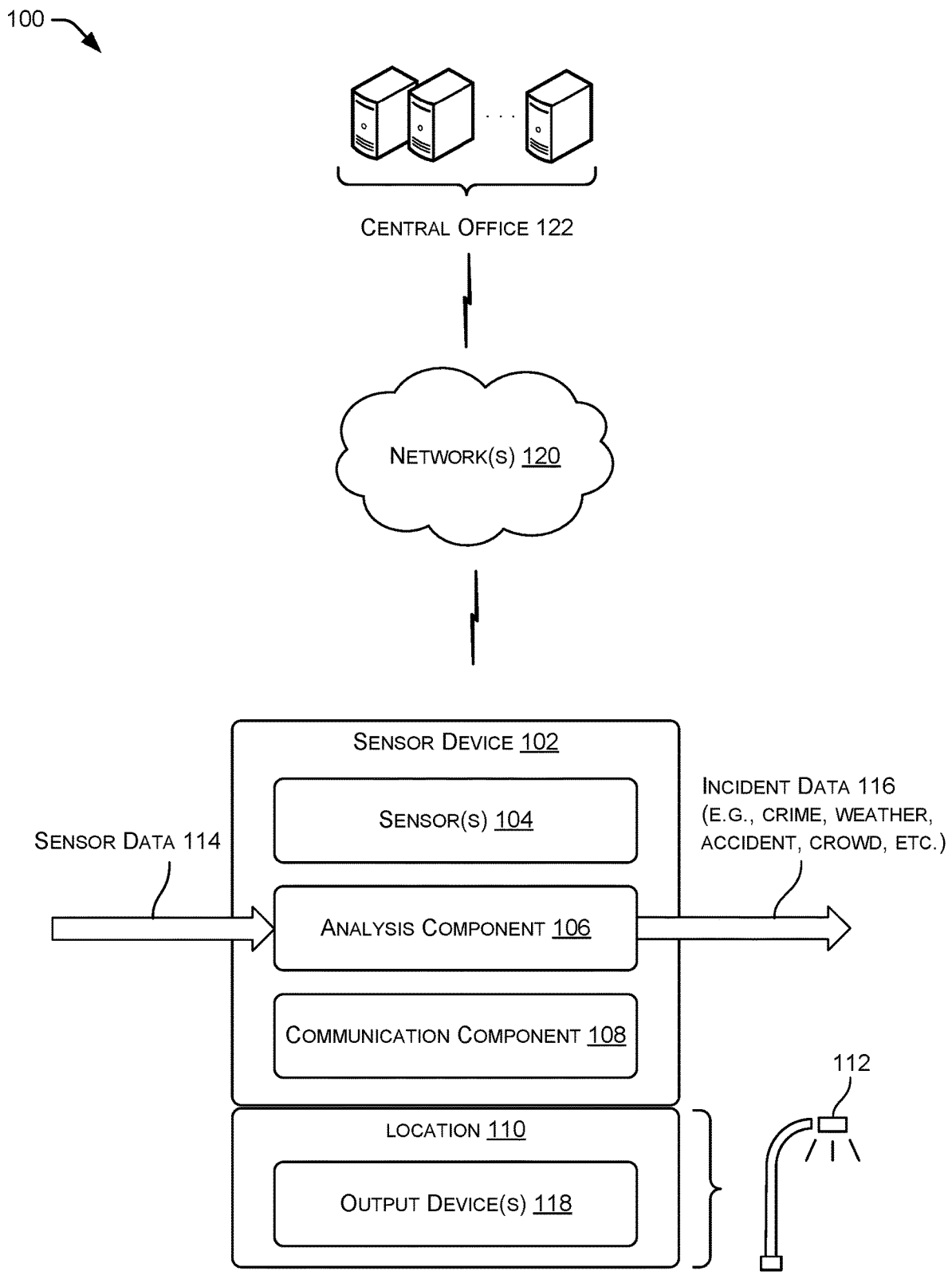
FIG. 1 is a block diagram showing an example environment in which an example sensor device determines incident data associated with an incident.

The disclosure describes techniques for determining information about an incident occurring in an environment. For example, a device proximate a sensor(s) can process sensor data to determine or otherwise detect an occurrence of a weather event, an accident, a crime, a crowd control event, a fire, a flood, or the like. In some examples, the device (e.g., computing device, sensor device, or the like) can receive sensor data from one or more sensors coupled to a streetlight adjacent a street, sidewalk, parking lot, or other public space. The techniques can include the device processing the sensor data to determine an incident type and an incident location for incidents. In some examples, the device can identify other sensors in a vicinity of the incident (e.g., attached to other streetlights, utility meters, transformers, etc.), and select sensors for gathering additional information about the incident based on the incident type and/or the incident location. In various examples, using devices at multiple different locations can determine information about the incident that may be difficult or impossible to determine by a single sensor or multiple sensors at a single location, and output the incident information to a computing device associated with an emergency entity (e.g., police, fire, ambulance, security service, etc.) to improve public safety.

The device may, for example, configure messages for sending to another sensor (or device) in other locations of the environment based on the incident type and the incident location. The device may also receive and process additional sensor data from the other sensors to output different levels of detail about the incident (e.g., a more refined location, a new attribute of the incident, etc.). By way of example and not limitation, the device can detect a crime, determine a crime type and location, and identify other sensors for receiving additional sensor data associated with the crime (e.g., to provide a different viewpoint, another sensor modality, etc.). In such examples, the device can generate detailed information about the crime usable to remedy an impact of the crime on the environment and/or a person in the environment (e.g., improve public safety, provide incident information to emergency services, protect the environment, etc.).

In some examples, the device can be coupled to a pole, streetlight, wall, roof, tunnel, bridge, traffic signal device, tree, or any other surface in the environment, or the device may be housed in its own standalone enclosure. Multiple devices may be deployed in the environment to collectively monitor the environment for illegal activity, accidents, emergencies, and the like. A streetlight, transformer, utility meter, manhole, fire hydrant (or other device) associated with a municipality, utility company, or other entity may include a variety of sensors to capture audio data, image data, video data, range data, gas data, water data, electrical data, etc., for processing. A single device can, for example, include one or more sensors for detecting an incident within a threshold distance of the device. Further description of detecting incident information is discussed throughout this disclosure including with reference to FIGS. 2 and 3 below.

In some examples, the device may implement one or more machine learning algorithms to determine data describing a detected incident. For instance, the device may implement a machine learned model that is trained to determine attributes of the incident based on an incident type. In this way, the device can output unique incident data for different incident types (e.g., output locations of shell casings when the incident is of a type associated with discharge of a firearm, output location of an object when the incident is of a type associated with a stolen object, generate an instruction for a streetlight to output a light color or pattern to convey (either alone or in conjunction with other lights on other streetlights) a path to safety when the incident is of an assault or theft type, to name just a few examples). In some examples, the device can determine a refined or improved location of an incident (versus the initial location determined using a single sensor).

The techniques described herein can include a system that includes logic, algorithms, models, and/or the like to differentiate between behavior associated with a safe environment and behavior that is indicative of illegal and/or dangerous activity. For instance, the device can analyze sensor data from a variety of different sensor types in different locations to determine output data representing detailed information about the incident. In some examples, the device can determine or identify other sensors from which to receive sensor data based on the incident type to ensure that the additional information is useful for the type of incident occurring (e.g., initiate a nearby license plate reading sensor to detect a stolen vehicle, initiate facial recognition to identify a person suspected of being associated with the crime, etc.).

The techniques described herein can be implemented in a number of ways. Example implementations are provided below with reference to the following figures. Although discussed in the context of a streetlight operated by a utility service provider, the methods, apparatuses, and systems described herein can be applied to a variety of systems and is not limited to being coupled to a streetlight or used by utility systems. By way of example and not limitation, the techniques described herein may be implemented using devices and/or sensors disposed in, disposed on, coupled to, and/or part of a structure such as a streetlight, transformer, utility meter, manhole, fire hydrant, power pole, telephone pole, relay, traffic light, parking meter, building, bridge, overpass, street sign, charging station, bus stop, weather station, mailbox, collection bin (e.g., garbage, recycling, etc.), tree, or other structure in the environment. In some examples, the techniques can be utilized in a smart city, or in any system using sensor data. When the techniques are applied in the smart city, a device can be configured to exchange data with entities of the smart city to remedy or reduce impact of an incident.

Example Systems and Techniques

FIG. 1 is a block diagram showing an example environment 100 in which an example sensor device (sensor device 102) determines incident data associated with an incident. As shown in FIG. 1, the sensor device 102 includes sensor(s) 104, an analysis component 106, and a communication component 108, and is shown coupled to a location 110 (e.g., a streetlight, a portion of a public right-of-way, a building, or other structure).

The sensor device 102 can include or otherwise represent software, firmware, and/or hardware for implementing the techniques described herein. Generally, the sensor device 102 can represent functionality to detect presence of an incident in the environment 100 such as a weather event, an accident, a crime, a crowd control event, a fire, a flood, electrical overload, and the like.

The sensor(s) 104 can include one or more of: a microphone, a camera, a location sensor, a lidar sensor, a radar sensor, an infrared sensor, a gas sensor, an electrical sensor, a fluid sensor, a temperature sensor, a time-of-flight sensor, an ultrasonic sensor, and an inertial sensor (e.g., to detect theft, seismic activity, etc.), just to name a few. As mentioned, the sensor(s) 104 may be coupled to a variety of locations (the location 110) or structures including but not limited to: a pole, a streetlight (e.g., streetlight 112), a wall, a tunnel, a fire hydrant, a sign, an electrical distribution point, a gas conduit, a water conduit, a manhole, a storage tank (of water, gas, etc.), or another surface in the environment.

In some examples, the sensor device 102 can represent a meter device such as smart utility meter or similar device used by a company to collect, aggregate, and/or manage electrical consumption, water consumption, gas consumption, or the like. In various examples, the location 110 can include a service switch configured to connect or disconnect (e.g., turn on and/or turn off) power, water, and/or gas, depending on the type of meter device(s) at the location 110. In various examples, the analysis component 106 can cause the service switch to turn off power, water, and/or gas at various locations including the location 110 and a proximity adjacent to the location 110.

In various examples, the analysis component 106 can receive sensor data 114 (e.g., audio data, image data, etc.) from the sensor(s) 104 as input to determine incident data 116 describing an incident in the environment 100. The system can then output information associated with the incident to one or more other devices or services. In some examples, the analysis component 106 can implement statistical, mathematical, and/or machine learned algorithms to determine whether the sensor data 114 is associated with an incident affecting public safety such as a crime, environmental impact, accident, and so on.

In some examples, the analysis component 106 can determine a type of incident occurring at a particular time and monitor the incident over a time period. For instance, the analysis component 106 can detect audio, images, etc. indicative of a firearm, a vehicle accident, audio requesting "help", and the like, by detecting, identifying, or otherwise determining one or more patterns in the sound or images associated with the sensor data 114. In some examples, the analysis component 106 can implement a machine learned model that is trained to identify patterns associated with different types of crime, accidents, or weather events at the location 110. The analysis component 106 can, in some examples, identify a location of the incident (relative to the location 110).

In some examples, the sensor data 114 can represent data associated with a frequency domain, harmonics, and the like. In such examples, the analysis component 106 can act as a discriminator to identify or classify frequencies representing sounds associated with different incidents. For instance, the analysis component 106 can implement a machine learned model that is trained to identify patterns in one or more frequencies and/or harmonics that are associated with discharging various types of weapons (e.g., identify an anomaly, or change, in the sensor data 114 over time, compare a pattern in the sensor data 114 to known patterns representing different types of incidents, and so on). For instance, for gunshot detection, the model can comprise a Convolutional Neural Network (CNN), a Recurrent Neural Network (RNN), a Hidden Markov Model (HMM), a Gaussian Mixture Model (GMM), and the like, that is trained using labelled gunshot audio pattern information to detect gunshots from various type of firearms. For vehicle theft detection, the model can comprise an RNN, a Support Vector Machines (SVM), an Anomaly Detection Model, etc. that is trained using labeled car alarm data to detect audio associated with various alarms types, frequencies, volumes, etc.

In some examples, the sensor data 114 can represent image data associated with one or more images detected in a vicinity of the sensor(s) 104. In such examples, the analysis component 106 can act as a discriminator to identify or classify objects in the image(s) associated with different incidents. For instance, the analysis component 106 can implement a machine learned model that is trained to identify an image or scene that is associated with anomalous behavior in the sensor data 114 based on comparing the image in the sensor data 114 to known images representing different types of incidents (or objects associated therewith). For example, a CNN (or other machine learned model) can be trained to detect an image having an object that is behaving unexpectedly relative to typical object behavior. The CNN can receive the sensor data 114 as input and classify an object type and/or object behavior (e.g., an action by the object at a particular time or over time) for each object in the image(s). Classifying the object behavior can include determining (outputting a classification for) whether an object is behaving normally or abnormally. In such examples, anomalous behavior of an object can include a pedestrian or vehicle breaking a law (e.g., the image includes a crime).

The analysis component 106 can determine a type of an incident and/or a location of the incident and identify other nearby sensors from which additional sensor data can be used to refine the location and/or provide other detail about the incident. For example, the analysis component 106 determine a type (e.g., a crime, weather event, medical emergency, crowd stampede, etc.) and optionally a sub-type (or subclassification) such as a) crime: robbery, gunshot, vehicle prowling, bomb, arson, hit and run, vandalism, and so on, b) weather event: dangerous cold or heat, precipitation, tornado, volcano, earthquake, etc., and c) emergency: fire, pedestrian, vehicle accident, etc. Additional examples of classifying an incident type or subtype are discussed elsewhere including in FIG. 2.

The analysis component 106 can identify another sensor at another location (e.g., another streetlight) based on the type and/or location of the incident. For example, based on the incident type and distance from the sensor, the analysis component 106 can determine which other sensor types may be employed for gathering additional data specific for the type and/or location of the incident. If the incident includes a medical emergency, for example, an additional camera at another location can be identified by the analysis component 106 that is useful for another field of view. In some examples, the communication component 108 can configure a message requesting sensor data from the other sensor (or device controlling the other sensor, for example). The message may request a desired orientation or resolution to improve detection of the incident based on the incident type.

The incident data 116 determined by the analysis component 106 can describe the incident based on sensor data from a single sensor or from multiple sensors. For example, an initial location determined by the sensor device 102 (based on sensor data from the sensor(s) 104) can be modified based on receiving and processing the additional sensor data from one or more additional sensor devices at different locations. Thus, the incident data 116 can indicate a more detailed location than the initial location determined by a single sensor device. In examples when the incident includes a flood, the analysis component 106 can identify which other locations near the incident location can be used and generate a message(s) for transmitting to the available sensors proximate the incident (e.g., additional water sensors to determine an area of the flood, a change in flood level over time, a water sensor to validate the occurrence of the flood, and so on).

In various examples, the analysis component 106 can determine magnitude and direction of a sound and pick sensors from which to receive additional sensor data that are located in a general direction of the sound and at a distance based on the magnitude of sound. In some examples, the analysis component 106 can determine a direction of travel of a person/object and then pick sensors from which to receive additional sensor data that are located in the direction of travel.

The analysis component 106 can implement a variety of techniques to determine a refined location of the incident. For example, the analysis component 106 can receive sensor data from multiple sensors and analyze the sensor data to determine a refined incident location (e.g., triangulation, looking at signal strength or magnitude of sounds to determine relative proximity to the incident, etc.).

The communication component 108 can provide functionality to enable the sensor device 102 to communicate with another computing device, sensor device, a utility company central office (e.g., central office 122), and so on. The communication component 108 may be configured to format data, such as into frames or data packets associated with one or more communications protocols that facilitate one-way and/or two-way communication with entities external to the sensor device 102. As an example, the communication component 108 may include a radio frequency (RF) transmitter, receiver and/or transceiver (not shown) to facilitate wireless communications, a power line communications (PLC) transceiver (not shown) for communication via a power line, a direct communication interface, etc.

In various examples, the communication component 108 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable current or future wired or wireless communications protocol that enables the sensor device 102 to interface with the other computing device(s).

For instance, the communication component 108 may send at least a portion of the incident data 116 to another sensor device to communicate current information about the incident, and receive additional sensor data from the other sensor to refine or update the incident data 116 over time. In some examples, the analysis component 106 can identify a sensor device having a different modality than the sensor device 102. In examples when the incident relates to preventing a crime detected by the sensor device, another sensor modality can be selected to gather additional information about the crime. Thus, the communication component 108 may be used to enable sensor devices located throughout an environment to exchange sensor data (or determinations therefrom) to dynamically detect incidents and determine which devices available in the environment to implement for gathering additional information about the incident.

FIG. 1 shows the location 110 (e.g., the streetlight 112) comprising one or more output device(s) 118. The output device(s) 118 can vary by location and can include a light(s) source for illuminating an area of the environment, a speaker(s) for emitting sound in the area, a display device to present text, an image, or a video, among others. In various example, the output device(s) at different locations can be coordinated to cause a sequence of light, sound, video, etc. for communicating a route to safety, or instructions to remedy the incident.

The incident data 116 from the sensor device 102 can be used in a variety of ways. For instance, the communication component 108 may send at least a portion of the incident data 116 to a storage device associated with the sensor device 102 (at the location 110 or at a remote location). The incident data 116 may also or instead be sent over network(s) 120 to a central office 122 associated with the utility provider and/or to the output device(s) 118 associated with the location 110. In such examples, the central office 122 may represent a headend device such as a server that manages sensor data and/or incident data associated with a variety of locations including the location 110.

In various examples, the analysis component 106 can control the output device(s) 118 based at least in part on the incident data 116. For instance, a color, intensity, or other setting of a light at the streetlight 112 can be modified to convey information associated with the incident. Streetlights at various locations can collectively output a sequence of light to indicate a path towards safety (e.g., a strobed or colored path to avoid a crowd stampede, for example). In examples when a speaker is included at the location 110, the analysis component 106 can generate different audio data for output by respective speakers to further communicate with people in the environment.

In some examples, the incident data 116 may also or instead be transmitted by the communication component 108 to an emergency service such as a fire service, police service, etc. For example, the incident data 116 may include details about a crime, an accident, or an emergency event to improve a response by the emergency service to remedy the incident. Further, the communication component 108 can generate an instruction based on the incident data 116 for sending to a traffic control device, streetlight, roadway marker, etc. to cause the traffic control device, streetlight, or roadway marker to provide a path for the emergency service to reach the location 110 more efficiently (relative to not coordinating with other devices and sensors, for example). In this way, the communication component 108 can cause the traffic control device to notify a pedestrian or vehicle to avoid the location associated with the incident.

In various examples, the sensor device 102 can make an initial determination about an incident and send the incident data 116 and/or sensor data associated with one or more time periods to the central office 122, and receive a confirmation or verification from the central office 122 validating or overriding the initial determination by the sensor device 102. For instance, the remote computing device may implement more sophisticated/powerful algorithms (than those implemented by the sensor device 102) and/or utilize more information from additional sensor devices (gas sensor, water sensor, electrical meter device, etc.) at other locations to either confirm or override the sensor device's determination. For instance, the central office 122 may utilize information about a power grid (e.g., power surges, voltage fluctuations, data from other nearby meters and/or transformers, etc.), water grid, gas grid, etc. to either confirm or override the sensor device's determination.

In some examples, the analysis component 106 and/or the central office 122 can assign a unique identifier to represent the incident data 116 determined based on sensor data from different sensors. The unique identifiers can be used by the analysis component 106 and/or the central office 122 to access incident data as needed at a later time, such as to investigate a potential crime. The unique identifier can identify incident data which is accessible for analysis by a computing device and/or a human.

In some examples, details about a particular incident can be configured for output in a user interface on a display device. For instance, the analysis component 106 can correlate sensor data from various sensors with the incident data 116, and a user or device can request and receive information about an incident (e.g., the analysis component 106 and/or the central office 122 receives a request for information about an incident by time or location, or some other criteria). Incident data can be configured to be human understandable while also providing options or controls for the user to access additional detail as needed. For instance, the unique identifier can be used to access incident data from a database or storage device for presentation on a map-based interface. The map-based interface can show detailed incident information including, but not limited to, one or more of: the location of the sensor(s) on the map, types of sensor data collected at each location (e.g., audio, image, temperature, etc.), the estimated location of the event (e.g., gun shot), location of salient people (e.g., perpetrator, victim, drivers, etc.), the location of any salient objects (e.g., guns, cars, shell casings, etc.), the locations of any impacts (e.g., collisions, projectile impacts, etc.), locations of emergency personnel, links to view the raw sensor data (e.g., audio data, image data, etc.), and the like. In some examples, the user interface can display incident information with respect to time. For example, a time slider or other control can enable a user to see the incidents unfold over multiple different time stamps, different perspectives, and so on.

The network(s) 120 may represent various networks including public and/or proprietary utility company networks, the internet, a wired network, a wireless network, an optical network, and/or other network types.

Figure 2:
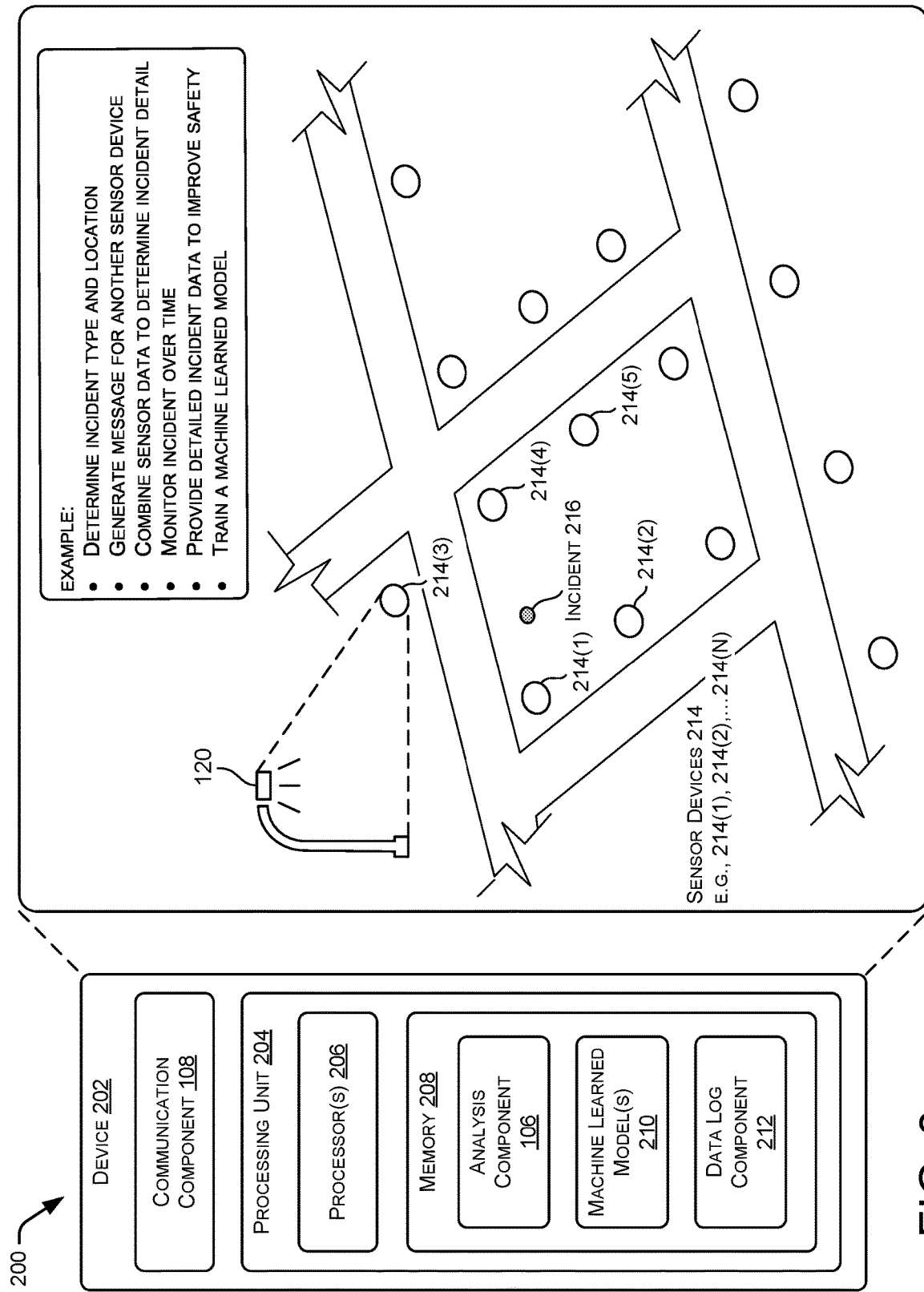
FIG. 2 is a block diagram showing another example environment in which an example sensor device implements the techniques described herein.

FIG. 2 is a block diagram of another example environment 200 in which an example device implements the techniques described herein. FIG. 2 shows a device 202 comprising the communication component 108, a processing unit 204 that includes one or more processor(s) 206 and one or more memor(ies) (shown as memory 208). The memory 208 includes the analysis component 106, a machine learned model(s) 210, and a data log component 212. FIG. 2 further depicts a sensor device 214(1), a sensor device 214(2), a sensor device 214(3), a sensor device 214(4), a sensor device 214(5), . . . , up to a sensor device 214(N) where N is an integer (referred to collectively as the sensor devices 214).

The device 202 can represent, in some examples, the sensor device 102 or the central office 122 of FIG. 1. In some examples, the device 202 can be located adjacent to or proximate one of the sensor devices 214 while in other examples the device 202 may be located remote from the sensor devices 214. The device 202 can comprise one or more sensor(s) coupled to the processing unit 204. The processing unit 204 may represent an application-specific integrated circuit (ASIC), field programmable gate array (FPGA), general purpose microprocessor, microcontroller, system or PC on a chip/card, or other suitable hardware logic. The memory 208 may comprise computer-readable storage media that includes, but is not limited to, RAM, ROM, EEPROM, flash memory, cache memory, or other hardware storage devices or hardware-based memory technology.

The analysis component 106 is configured to receive data from the one or more sensor(s) (e.g., the sensor(s) 104, sensor(s) of another sensor device) and process the sensor data to detect an incident 216 (e.g., event affecting the environment or people therein). In some examples, the analysis component 106 can implement a machine learned model(s) 210 that is configured to determine an occurrence of the incident 216 based on detecting a noise or image in the sensor data. The machine learned model(s) 210 can be trained based on training data that indicates which sounds, images, etc. are indicative of different types of incidents.

Additionally, or alternatively, the machine learned model(s) 210 can implement an algorithm that detects abnormal electrical activity, gas activity, water activity, etc. for a load or a combination of loads over time. For example, the algorithm can identify a change in an amount of electrical activity (e.g., voltage, current, power, frequency, etc.) between a first time period and a second time period, and determine whether the amount of change is within a threshold amount of change. In examples when the amount of change is greater than the threshold amount, the machine learned model(s) 210 can output an indication that the electrical activity is potentially unsafe. While described in relation to electrical activity, similar techniques can be used to determine unsafe events in a water system and/or a gas system.

The machine learned model(s) 210 can be trained to identify an electrical incident, water incident, gas incident, and the like based on historical data associated with a particular location. For example, historical usage data and/or incident information for different locations can be considered by the device 202 (e.g., used as input data to the machine learned model(s) 210, or another model or component). In this way, the device 202 can make incident determinations based on history of electrical, water, or gas usage at each specific location.

The analysis component 106 can, in various examples, monitor changes in the incident 216 over time. For example, the analysis component 106 may receive real-time data (e.g., sensor data received from the sensor device 214(1) each second or other timeframe), analyze the data and determine a type (e.g., classification, sub-classification) and location of the incident 216 (e.g., an initial location). The incident 216 may represent a crime or impact to public safety or any other of the examples described herein. In some examples, the analysis component 106 may analyze the data based on a machine learning decision tree, or other algorithm, that determines a type of the incident 216 (e.g., type of crime, type of weather event, etc.). Responsive to detecting the incident 216, the analysis component 106 can generate messages for other sensor devices to cause the other sensor devices to generate additional sensor data associated with the incident 216.

In various examples, the device 202 can combine sensor data from the additional sensors to determine the incident data output by the device 202. For example, the device 202 can receive sensor data from one or more sensors associated with the sensor device 214(3) which is shown coupled to a streetlight (e.g., the streetlight 112) and implement one or more of: the analysis component 106, the machine learned model(s) 210, the data log component 212, and/or the communication component 108 to exchange sensor data and/or incident data determined therefrom with the sensor device 214(1), the sensor device 214(2), the sensor device 214(4), and the sensor device 214(5). In such examples, data from the other sensor devices can be processed by the device 202 to output updated incident data. For example, a camera associated with the sensor device 214(4) can capture a different field of view of the incident 216 while a microphone can capture sound information relative to the other location. The device 202 can process the sound information from the microphone and data from the camera to improve an initial determination (update the type of location of the incident) and/or to determine a new attribute of the incident 216 (locations of objects discarded by a suspect, a route previously used by a suspect, fire burn patterns, vehicular information (e.g., make, color, license plate number, RFID information), a region of impact, description of a suspect, skid marks on a roadway, etc.).

In some examples, the analysis component 106 can determine a region associated with the incident 216. For example, the analysis component 106 can define an area impacted by, or potentially impacted by, the incident 216. In various examples, the region can represent a geofence or a proximity around the incident 216. The analysis component 106 can, for example, define the region to include a boundary at a threshold distance from the incident 216 based on the incident type (e.g., the region for a crowd stampede can depend upon a number of people, etc.), a magnitude or direction of sound, a direction of travel by an object, etc. A size or shape of the region can vary over time to reflect an area impacted by the incident 216.

In some examples, the analysis component 106 can determine a threshold distance from the incident 216 based on an incident type, a magnitude of a sensor signal, and/or a direction of the sensor signal (e.g., magnitude of the sound, direction of the sound using one or more microphones, etc.). For example, the threshold distance from the incident 216 can vary according to a sensor type, the magnitude, and/or the direction associated with signals from the sensor.

The data output by the device 202 can be provided to a variety of computing devices including those associated with an emergency service provider, municipalities, or other entities responsible for public safety or environmental protection. That is, the device 202 can output incident data based on detections from one or more sensors proximate the device 202 and/or incident data based on detections from sensors associated with multiple sensor devices located throughout the environment.

In some examples, the incident data determined by the device 202 can be used to cause the streetlight 112 to change a setting or parameter of a light, speaker, and/or display. For example, multiple lights associated with different streetlights can be coordinated by the device 202 by sending messages with instructions for outputs specific for each light to collectively cause a sequence of lights that communicates to persons in the environment. Lights, can, for example, illuminate a route to safety, change color to indicate a direction of safety (e.g., red to green), turn on and off at different rates, or other type of light output.

The data log component 212 is configured to log or store the sensor data (e.g., the sensor data 114) and/or the incident data (e.g., the incident data 116) in a database, memory, or other storage location. Implementing the data log component 212 enables data to be available for processing by the analysis component 106 and/or to be available for training the machine learned model(s) 210. In some examples, the data log component 212 can associate timestamps with stored data to indicate a time period for the stored data. In some instances, the data log component 212 can store and label data representing raw sensor data, processed sensor data, incident data from a single sensor device, incident data based on data input from multiple sensor devices, etc.

In some examples, the analysis component 106 can receive log data from the data log component 212 usable for determining incident data describing an incident. For example, the log data can represent historical sensor data and/or historical incident data for the analysis component 106 to compare to currently received sensor data in order to classify or detect changes in the environment indicative of an incident.

While shown in FIG. 2 as a single block, processing unit 204 may be implemented as one or more separate devices and/or a parallel processing unit and is communicatively coupled to the memory 208. While shown as separate blocks, the analysis component 106, the communication component 108, the machine learned model(s) 210 may be implemented as a single component or device and/or as multiple devices.

Figure 3:
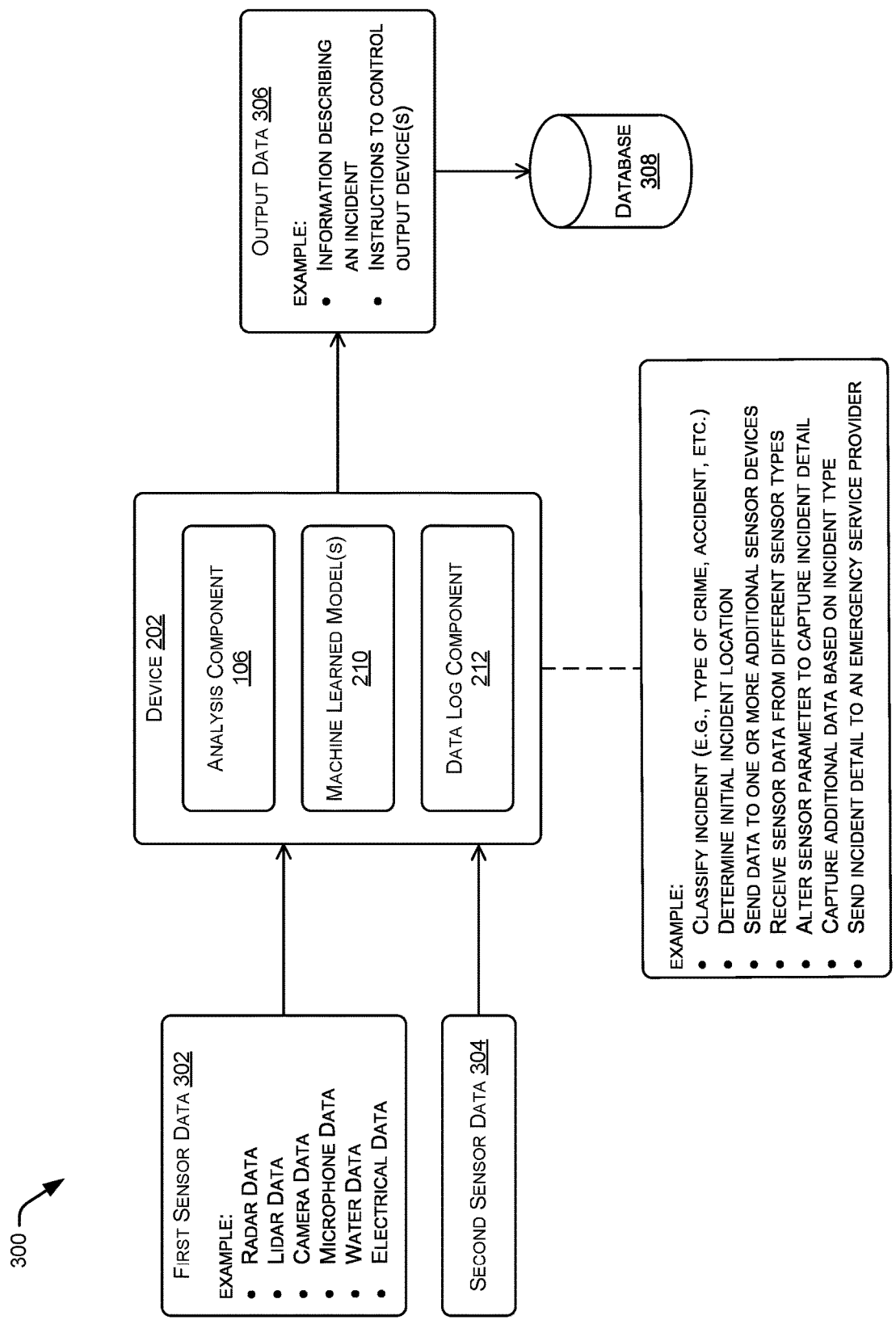
FIG. 3 is an example block diagram of an example device for implementing techniques to determine incident data as described herein.

FIG. 3 is an example block diagram 300 of an example device implementing example components for determining incident data as described herein. For example, the device 202 of FIG. 2 can implement the analysis component 106, the machine learned model(s) 210, and/or the data log component 212 to determine incident data for one or more incidents in an environment.

FIG. 3 shows the device 202 receiving first sensor data 302 and second sensor data 304 from two different sensors in an environment (e.g., two sensors at a single streetlight, or a first sensor at a first streetlight and a second sensor at a second streetlight). The first sensor data 302 and/or the second sensor data 304 may be received from a variety of different sensor modalities such as a radar sensor, a lidar sensor, a camera, a microphone, and the like. The first sensor data 302 and/or the second sensor data 304 may represent one or more of: radar data, lidar data, camera data, microphone data, water data, electrical data, gas data, temperature data, inertial data, or other sensor data depending upon a sensor type used to capture such data.

In various examples, the device 202 can implement the analysis component 106, the machine learned model(s) 210, and/or the data log component 212 to classify or determine a type of incident occurring in an environment. For example, the analysis component 106 can implement one or more algorithms to compare changes in sensor data received over time to known sounds and/or images associated with different classifications. Further, the machine learned model(s) 210 can employ a machine learned decision tree or other algorithm that identifies whether the change in sound and/or images is associated with an incident type representing one of multiple predetermined incident types.

As mentioned, the first sensor data 302 and/or the second sensor data 304 can be received from different sensor types or modalities. The second sensor data 304 may be received based on the device receiving the first sensor data 302 at a first time, and configuring a message for a second sensor that causes the device 202 to receive the second sensor data at a second time. However, in other examples the first sensor data 302 and the second sensor data 304 may be received at substantially a same time (e.g., in examples when the sensor device 214(3) includes two or more sensors, or in response to another sensor device automatically sending additional sensor data associated with an incident to the device 202).

The device 202 can determine output data 306 indicating information about a detected incident and/or an instruction for controlling an output device(s) (e.g., a light, a microphone, etc.) or another sensor device. In various examples, the output data 306 can be stored in a database 308.

In some examples, the device 202 can send a message comprising incident data determined based on the first sensor data 302 to a second sensor device. In response to sending the message, the second sensor device can modify a parameter to change how the sensor device detects information relative to the incident. For example, the device 202 can send an instruction to the second sensor device causing the field of view, resolution, or other setting to improve capturing of detail related to the incident. The message may, for example, further instruct the second sensor device about which type of information to collect relative to the incident. For example, the message may include a type of crime, accident, or environmental event that requires a different action for collecting additional information. In some examples, the second sensor device can provide sensor data to the device 202 for processing to improve an estimated location of the incident.

Example Incident Determination Method

Figure 4:
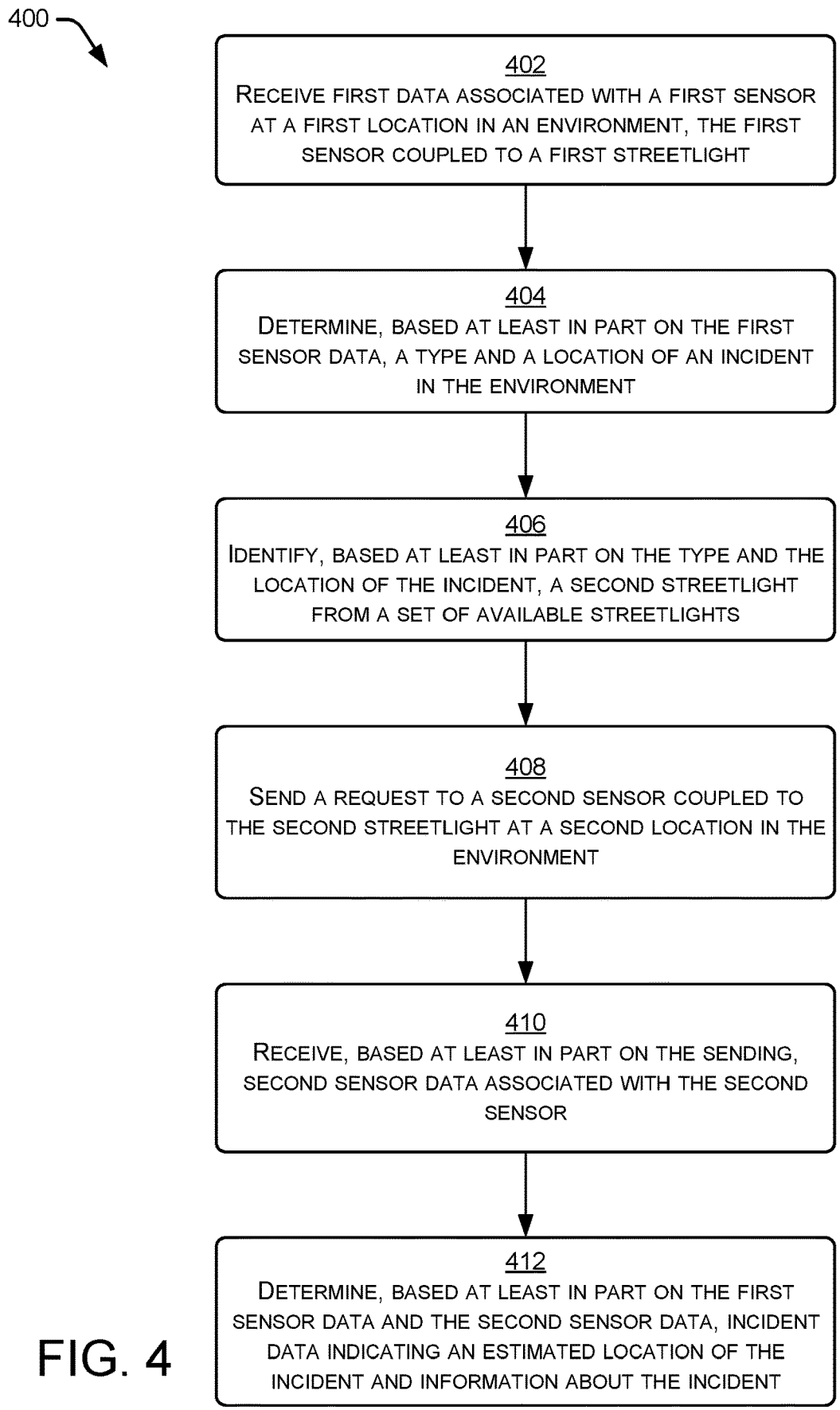
FIG. 4 is a flowchart depicting an example process for determining incident data using one or more example components of an example device.

FIG. 4 is a flow diagram showing example process 400 which is representative of techniques for a device to detect and report incidents in an environment. The processes may, but need not necessarily, be implemented in whole or in part by or within the environment 100 and/or one or more of the devices of FIGS. 1 through 3. In the examples and techniques discussed herein, the methods of operation may be performed by one or more application specific integrated circuits (ASICs) or may be performed by a general-purpose processor utilizing software defined in computer readable media. In the examples and techniques discussed herein, the memory 208 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. The various algorithms, machine learned models, logical expressions, functions, steps, and/or operations of the processes described herein may be encoded in computer-readable instructions, data structures, program modules, and/or other data to implement the various techniques described herein.

As defined herein, computer-readable media includes non-transitory computer-readable media as well as transitory media, such as modulated data signals and carrier waves, and/or signals.

FIG. 4 is a flowchart depicting an example process 400 for determining incident data using one or more example components of an example device.

At operation 402, the process 400 may include receiving first sensor data associated with a first sensor at a first location in an environment, the first sensor coupled to a first streetlight. In some examples, the operation 402 may include the sensor device 102 of FIG. 1 or the device 202 of FIG. 2 implementing the analysis component 106 to receive sensor data from a sensor in an environment, such as a sensor coupled to a public structure (e.g., a streetlight, a pole, a bridge, a tunnel, a roadway, a crosswalk, etc.). For example, the device 202 can receive image data, audio data, gas data, water data, temperature data, etc. from a sensor associated with the streetlight 112. The temperature data may be indicative of a fire, for example, while the water data may be indicative of a fire hydrant being opened and/or struck by a vehicle or other object. Image data or audio data can include objects (a gun, bomb, or other weapon, or items associated therewith) and/or events indicative of an incident affecting safety of the environment and/or people in the environment. For example, an incident can include an unintentional discharge of gas into the environment, and the techniques can be used to detect the incident, and take an action to remedy the incident (e.g., report detailed incident data usable by an emergency service provider).

At operation 404, the process 400 may include determining, based at least in part on the first sensor data, a type and a location of an incident in the environment. In some examples, the operation 404 may include the analysis component 106 classifying a type of an incident represented by the sensor data (or an object or event associated therewith). The analysis component 106 may, for example, employ mathematical algorithm(s), statistical analysis, and/or machine learning technique(s) to compare harmonics, images, or other attributes of the first sensor data. For instance, the analysis component 106 may implement a machine learned decision tree and/or a machine learned algorithm to identify differences in audio and/or visual indicators indicative of an incident (e.g., audio related to different crimes, audio related to an illegal discharge of a firearm, among others).

The operation 404 may also or instead include the analysis component 106 determining a location of the incident based on the first sensor data. For example, the incident location can represent an initial location. For example, the analysis component 106 can determine a distance between the detected incident (or object associated with the incident) and the sensor.

At operation 406, the process 400 may include identifying, based at least in part on the type of incident, a second streetlight from a set of available streetlights. In some examples, the operation 406 may include the analysis component 106 identifying sensors available on different streetlights in the environment and select a streetlight with a particular sensor type based on the incident type and incident location. For example, in examples when the incident is a medical emergency, the analysis component 106 can identify a streetlight having a camera suitable for obtaining additional information about the medical emergency. In some examples, the analysis component 106 can access a pre-determined list of sensors in an environment and the corresponding locations, sensor types, etc.

At operation 408, the process 400 may include sending a request to a second sensor coupled to the second streetlight at a second location in the environment. In some examples, the operation 408 may include the communication component 108 configuring a message for sending to the second streetlight that includes a request for sensor data from the second sensor. The message can include or otherwise identify the incident type and/or the incident location. In various examples, the message can request sensor data associated with a previous time, a current time, or for a period of time in the future. The second streetlight can determine whether to change or alter an existing sensor setting to capture sensor data associated with the incident from another location.

At operation 410, the process 400 may include receiving, based at least in part on the sending, second sensor data associated with the second sensor. In some examples, the operation 410 may include the communication component 108 receiving the second sensor data from the second sensor coupled to the second streetlight.

At operation 412, the process 400 may include determining, based at least in part on the first sensor data and the second sensor data, incident data indicating an estimated location of the incident and information about the incident. In some examples, the operation 412 may include the analysis component 106 determining a location of the incident based at least in part on the first and second sensor data. Information such as supplementary or additional detail about the incident represented by the second sensor data may also be determined as output data (e.g., the output data 306).

In some examples, the communication component 108 can send a message via one or more networks to report the incident to another computing device or emergency service provider. A message may also or instead be configured for sending a portion of the incident data to a computing device remote from the device 202 (e.g., the central office 122).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. For example, the operation 408 may be omitted and sensor data can be received from one or more additional sensors automatically without sending a request to the additional sensor(s). Moreover, the methods described herein can be combined in whole or in part with each other or with other methods.

Example Clauses

Any of the example clauses in this section may be used with any other of the example clauses and/or any of the other examples or embodiments described herein.

A: A method, comprising: receiving first sensor data associated with a first sensor at a first location in an environment, the first sensor coupled to a first streetlight; determining, based at least in part on the first sensor data, an occurrence of an incident in the environment that impacts safety; determining a type of the incident and a location of an incident; configuring a message for a second sensor at a second location in the environment, the second sensor coupled to a second streetlight; transmitting the message to the second sensor; receiving, based at least in part on the transmitting, second sensor data associated with the second sensor; determining, based at least in part on the first sensor data and the second sensor data, incident data indicating an estimated location of the incident and information about the incident; and storing the incident data for access by a computing device configured to remedy an impact of the incident.

B: The method of paragraph A, further comprising: identifying a third streetlight having a third sensor that is different from the first sensor associated with the first streetlight and the second sensor associated with the second streetlight; and receiving third sensor data from the third sensor at a third location in the environment; wherein determining the incident data is further based at least in part on the third sensor data.

C: The method of paragraph A or B, further comprising: receiving meter data from a meter device comprising one or more sensors, the meter data indicating an occurrence of an electrical event or a water event; wherein determining the incident data is further based at least in part on the meter data.

D: The method of any of paragraphs A-C, further comprising: generating, based at least in part on the incident data, an instruction indicating a visual indicator for output by a light source associated with the first streetlight or the second streetlight; and sending the instruction to the first streetlight or the second streetlight to cause output of the visual indicator using the light source.

E: The method of any of paragraphs A-D, further comprising: sending at least a portion of the incident data to a traffic control device to control the traffic control device relative to the estimated location of the incident; and causing, by the traffic control device, a notification to a pedestrian or vehicle to avoid the estimated location.

F: The method of any of paragraphs A-E, further comprising: sending at least a portion of the incident data to a device associated with an emergency service provider.

G: The method of any of paragraphs A-F, wherein: the first sensor comprises at least one of: a microphone, a camera, a location sensor, a lidar sensor, a radar sensor, or a temperature sensor, and the message indicates the type of the incident and the location of the incident.

H: One or more non-transitory computer-readable media storing instructions executable by one or more processors, wherein the instructions, when executed, cause the one or more processors to perform operations comprising: receiving first sensor data associated with a first sensor at a first location in an environment, the first sensor coupled to a first streetlight; determining, based at least in part on the first sensor data, a type and a location of an incident in the environment; identifying, based at least in part on the type of incident, a second streetlight from a set of available streetlights; sending the type of the incident and the location of the incident to a second sensor coupled to the second streetlight at a second location in the environment; receiving, based at least in part on the sending, second sensor data associated with the second sensor; and determining, based at least in part on the first sensor data and the second sensor data, incident data indicating an estimated location of the incident and information about the incident.

I: The one or more non-transitory computer-readable media of paragraph H, wherein the first streetlight or the second streetlight comprises at least one of: a microphone, a camera, a location sensor, a lidar sensor, a radar sensor, or a temperature sensor, and the operations further comprising: storing the incident data for access by a computing device configured to remedy an impact of the incident.

J: The one or more non-transitory computer-readable media of paragraph H or I, the operations further comprising: identifying a third streetlight having a third sensor that is different from the first sensor associated with the first streetlight and the second sensor associated with the second streetlight; and receiving third sensor data from the third sensor at a third location in the environment; wherein determining the incident data is further based at least in part on the third sensor data.

K: The one or more non-transitory computer-readable media of any of paragraphs H-J, the operations further comprising: receiving meter data from a meter device comprising one or more sensors, the meter data indicating an occurrence of an electrical event or a water event; wherein determining the incident data is further based at least in part on the meter data.

L: The one or more non-transitory computer-readable media of any of paragraphs H-K, the operations further comprising: generating, based at least in part on the incident data, an instruction indicating a visual indicator for output by a light source associated with the first streetlight or the second streetlight; and sending the instruction to the first streetlight or the second streetlight to cause output of the visual indicator using the light source.

M: The one or more non-transitory computer-readable media of any of paragraphs H-L, the operations further comprising: sending at least a portion of the incident data to a traffic control device to control the traffic control device relative to the estimated location of the incident; and causing, by the traffic control device, a notification to a pedestrian or vehicle to avoid the estimated location.

N: The one or more non-transitory computer-readable media of any of paragraphs H-M, the operations further comprising: sending at least a portion of the incident data to a device associated with an emergency service provider.

O: The one or more non-transitory computer-readable media of any of paragraphs H-N, the operations further comprising: monitoring the incident for a period of time to identify a region impacted by the incident; and at least one of: configuring a first message for sending to the second sensor of the second streetlight requesting a greater level of detail; or configuring a second message for sending to the second sensor of the second streetlight indicating the incident is no longer occurring.

P: The one or more non-transitory computer-readable media of any of paragraphs H-O, the operations further comprising: inputting the first sensor data and the second sensor data to a machine learned model trained to determine the type of incident; and receiving an output from the machine learned model representing the incident data.

Q: The one or more non-transitory computer-readable media of paragraph O, wherein identifying the second streetlight from the set of available streetlights comprises: determining a threshold distance from the location of the incident based at least in part on the type of the incident; identifying the set of available streetlights based at least in part on the threshold distance; and selecting the second streetlight from the set of available streetlights based at least in part on a distance between the location of the incident and the second location of the second streetlight.

R: A meter device, comprising: an electrical sensor; one or more processors; and one or more non-transitory computer-readable media storing instructions executable by the one or more processors, wherein the instructions, when executed, cause the meter device to perform operations comprising: receiving first sensor data associated with a first sensor at a first location in an environment, the first sensor coupled to a first streetlight; determining, based at least in part on the first sensor data, a type and a location of an incident in the environment; identifying, based at least in part on the type of incident, a second streetlight from a set of available streetlights; sending the type of the incident and the location of the incident to a second sensor coupled to the second streetlight at a second location in the environment; receiving, based at least in part on the sending, second sensor data associated with the second sensor; and determining, based at least in part on the first sensor data and the second sensor data, incident data indicating an estimated location of the incident and information about the incident.

S: The meter device of paragraph R, further comprising a service switch to connect or disconnect power to the location, and the operations further comprising: disconnecting, by the service switch, power to the location based at least in part on the incident data.

T: The meter device as recited in paragraph R or S, operations further comprising: identifying a third streetlight having a third sensor that is different from the first sensor associated with the first streetlight; and receiving third sensor data from the third sensor;

wherein determining the incident data is further based at least in part on the third sensor data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving first sensor data associated with a first sensor at a first location in an environment, the first sensor coupled to a first streetlight;
determining, based at least in part on the first sensor data, an occurrence of an incident in the environment that impacts safety;
determining a type of the incident and a location of the incident;
configuring a message for a second sensor at a second location in the environment, the second sensor coupled to a second streetlight;
transmitting the message to the second sensor;
receiving, based at least in part on the transmitting, second sensor data associated with the second sensor;
determining, based at least in part on the first sensor data and the second sensor data, incident data indicating an estimated location of the incident and information about the incident;
receiving information associated with a power grid, the information associated with the power grid representing one or more of: a power surge, a voltage fluctuation, transformer data, or meter data;
confirming the incident data based at least in part on the information associated with the power grid;
sending at least a portion of the incident data to a device configured to remedy an impact of the incident; and
causing a notification to a pedestrian or vehicle to avoid the estimated location.

2. The method of claim 1, further comprising:
identifying a third streetlight having a third sensor that is different from the first sensor associated with the first streetlight and the second sensor associated with the second streetlight; and
receiving third sensor data from the third sensor at a third location in the environment;
wherein determining the incident data is further based at least in part on the third sensor data.

3. The method of claim 1, further comprising:
generating, based at least in part on the incident data, an instruction indicating a visual indicator for output by a light source associated with the first streetlight or the second streetlight; and
sending the instruction to the first streetlight or the second streetlight to cause output of the visual indicator using the light source.

4. The method of claim 1, wherein:
the device comprises a traffic control device, and
causing the notification comprises causing, by the traffic control device, the notification to the pedestrian or the vehicle to avoid the estimated location.

5. The method of claim 1, wherein:
the device is associated with an emergency service provider.

6. The method of claim 1, wherein:
the first sensor comprises at least one of: a microphone, a camera, a location sensor, a lidar sensor, a radar sensor, or a temperature sensor, and
the message indicates the type of the incident and the location of the incident.

7. One or more non-transitory computer-readable media storing instructions executable by one or more processors, wherein the instructions, when executed, cause the one or more processors to perform operations comprising:
receiving first sensor data associated with a first sensor at a first location in an environment, the first sensor coupled to a first streetlight;
determining, based at least in part on the first sensor data, a type and a location of an incident in the environment;
identifying, based at least in part on the type of the incident, a second streetlight from a set of available streetlights;
sending the type of the incident and the location of the incident to a second sensor coupled to the second streetlight at a second location in the environment;
receiving, based at least in part on the sending, second sensor data associated with the second sensor;
determining, based at least in part on the first sensor data the second sensor data, incident data indicating an estimated location of the incident and information about the incident;
receiving information associated with a power grid, the information associated with the power grid representing one or more of: a power surge, a voltage fluctuation, transformer data, or meter data;
confirming, as confirmed incident data, the incident data based at least in part on the information associated with the power grid;
sending at least a portion of the confirmed incident data to a device configured to remedy an impact of the incident; and
causing a notification to a pedestrian or vehicle to avoid the estimated location.

8. The one or more non-transitory computer-readable media of claim 7, wherein the first streetlight or the second streetlight comprises at least one of: a microphone, a camera, a location sensor, a lidar sensor, a radar sensor, or a temperature sensor.

9. The one or more non-transitory computer-readable media of claim 7, the operations further comprising:
identifying a third streetlight having a third sensor that is different from the first sensor associated with the first streetlight and the second sensor associated with the second streetlight; and
receiving third sensor data from the third sensor at a third location in the environment;
wherein determining the incident data is further based at least in part on the third sensor data.

10. The one or more non-transitory computer-readable media of claim 7, the operations further comprising:

generating, based at least in part on the incident data, an instruction indicating a visual indicator for output by a light source associated with the first streetlight or the second streetlight; and sending the instruction to the first streetlight or the second streetlight to cause output of the visual indicator using the light source.

11. The one or more non-transitory computer-readable media of claim 7, the device comprising a traffic control device; and causing the notification comprising causing, by the traffic control device, the notification to the pedestrian or the vehicle to avoid the estimated location.

12. The one or more non-transitory computer-readable media of claim 7, wherein:

the device is associated with an emergency service provider.

13. The one or more non-transitory computer-readable media of claim 7, the operations further comprising:

monitoring the incident for a period of time to identify a region impacted by the incident; and at least one of:

configuring a first message for sending to the second sensor of the second streetlight requesting a greater level of detail; or configuring a second message for sending to the second sensor of the second streetlight indicating the incident is no longer occurring.

14. The one or more non-transitory computer-readable media of claim 7, the operations further comprising:

inputting the first sensor data and the second sensor data to a machine learned model trained to determine the type of the incident; and receiving an output from the machine learned model representing the incident data.

15. The one or more non-transitory computer-readable media of claim 13, wherein identifying the second streetlight from the set of available streetlights comprises:

determining a threshold distance from the location of the incident based at least in part on the type of the incident;

identifying the set of available streetlights based at least in part on the threshold distance; and selecting the second streetlight from the set of available streetlights based at least in part on a distance between the location of the incident and the second location of the second streetlight.

16. A meter device, comprising:

an electrical sensor;

one or more processors; and one or more non-transitory computer-readable media storing instructions executable by the one or more processors, wherein the instructions, when executed, cause the meter device to perform operations comprising:

receiving first sensor data associated with a first sensor at a first location in an environment, the first sensor coupled to a first streetlight;

determining, based at least in part on the first sensor data, a type and a location of an incident in the environment;

identifying, based at least in part on the type of the incident, a second streetlight from a set of available streetlights;

sending the type of the incident and the location of the incident to a second sensor coupled to the second streetlight at a second location in the environment;

receiving, based at least in part on the sending, second sensor data associated with the second sensor;

determining, based at least in part on the first sensor data and the second sensor data, incident data indicating an estimated location of the incident and information about the incident;

receiving information associated with a power grid, the information associated with the power grid representing one or more of: a power surge, a voltage fluctuation, transformer data, or meter data;

confirming the incident data based at least in part on the information associated with the power grid; and disconnecting, by a service switch and based at least in part on confirming the incident data, power, gas, or water to a third location proximate the first location or the second location.

17. The meter device as recited in claim 16, the operations further comprising:

identifying a third streetlight having a third sensor that is different from the first sensor associated with the first streetlight; and receiving third sensor data from the third sensor;

wherein determining the incident data is further based at least in part on the third sensor data.

18. The meter device as recited in claim 16, the operations further comprising:

sending a notification indicating that the gas or the water is disconnected at the third location to an emergency service provider.

19. The method of claim 1, further comprising:

inputting the first sensor data, the second sensor data, and the meter data into a machine learned model trained to identify patterns associated with different types of incidents; and determining the type of the incident based at least in part on output data from the machine learned model.

20. The method of claim 1, wherein confirming the incident data comprises validating presence of the incident.

* * * * *